United States Patent
Seufert et al.

(10) Patent No.: US 9,152,626 B2
(45) Date of Patent: Oct. 6, 2015

(54) TRANSACTIONAL-CONSISTENT CACHE FOR DATABASE OBJECTS

(75) Inventors: Thomas Seufert, Plankstadt (DE); Norman May, Karlsruhe (DE)

(73) Assignee: SAP SE, Walldorf (DE)

( * ) Notice: Subject to any disclaimer, the term of this patent is extended or adjusted under 35 U.S.C. 154(b) by 148 days.

(21) Appl. No.: 13/330,619

(22) Filed: Dec. 19, 2011

(65) Prior Publication Data
US 2013/0159631 A1    Jun. 20, 2013

(51) Int. Cl.
| | |
|---|---|
| G06F 12/00 | (2006.01) |
| G06F 13/00 | (2006.01) |
| G06F 13/28 | (2006.01) |
| G06F 17/30 | (2006.01) |
| G06F 12/08 | (2006.01) |
| G06F 9/38 | (2006.01) |

(52) U.S. Cl.
CPC .............. *G06F 17/30* (2013.01); *G06F 9/3834* (2013.01); *G06F 9/3838* (2013.01); *G06F 12/0815* (2013.01)

(58) Field of Classification Search
CPC ................ G06F 9/3838; G06F 9/3834; G06F 17/30902; G06F 12/0815; G06F 9/3004; Y10S 707/99952
USPC ........................................ 711/128, 129, 141
See application file for complete search history.

(56) References Cited

U.S. PATENT DOCUMENTS

| 2001/0049770 A1* | 12/2001 | Cai et al. ........................ 711/129 |
| 2002/0111992 A1* | 8/2002 | Copeland et al. .............. 709/203 |
| 2002/0147887 A1* | 10/2002 | Copeland et al. .............. 711/118 |
| 2007/0168619 A1* | 7/2007 | Hutton et al. .................. 711/141 |

* cited by examiner

*Primary Examiner* — Charles Rones
*Assistant Examiner* — Sidney Li
(74) *Attorney, Agent, or Firm* — Mintz Levin Cohn Ferris Glovsky and Popeo, P.C.

(57) ABSTRACT

A system and method for providing a transactional-consistent cache for database objects is disclosed. New data is received by a cache manager. The cache manager updates an entry of a cache with the new data received by the cache manager, by registering the updating of the entry with the new data with an invalidator. The registering includes a timestamp. An invalidation event is then generated by the invalidator. The invalidation event includes a notification about the updating of the entry of the cache with the new data received by the cache manager according to the timestamp.

12 Claims, 3 Drawing Sheets

TRANSACTIONAL-CONSISTENT CACHE FOR DATABASE OBJECTS

TECHNICAL FIELD

The subject matter described herein relates to cache memory of database systems, and more particularly to transactional-consistent cache for database query results.

BACKGROUND

For fast query processing, some database systems, such as in-memory database (IMDB) systems, employ a number of caches to avoid repeated expensive computation. As a result of using such caches, query response times are reduced. Caches are currently used for a number of applications or use cases of applications, such as, e.g. query results of the column store, models of the calculation engine, hierarchies, or query plans.

The cached entries usually depend on other data. For example, a query result depends on referenced tables and views (and recursively on further views or tables). As some IMDB systems realize transaction-consistent snapshots as part of their multi-version concurrency control (MVCC), in which the cached content must be invalidated if any of the sources of a cached entry changes. Essentially, some changes of a cached entry require a cache replacement strategy. The cache replacement strategy is used when the cache is full, but new entries should be inserted. Based on the replacement strategy, old entries are removed to make space for new entries. Potentially, caches will need to offer access to older, invalid snapshots.

One challenge of transaction-consistent caches is the need to implement an efficient invalidation mechanism that is also extensible, to support different kinds of cached objects and different types of dependencies including tables, view definitions, or privileges.

Both query result caching and materialized views are techniques that are used to speed up query performance for common sub-expressions. However, caching does not require prior modeling of the materialized entries. On the other hand, sophisticated techniques to match view definitions to queries do exist for better reusability of materialized data. Techniques for matching cached content are typically not as powerful as those for matching views or indices. Both materialized views and caches require updates or invalidation in the presence of changes applied to the base data.

SUMMARY

This document describes a system and method providing a transactional-consistent cache for database objects.

The systems and methods described herein can be used to cache any type of data, including query results of a column store, models of a calculation engine, and hierarchies. Using caches as described herein, along with the minimal overhead associated to invalidation, leads to improved performance of an IMDB.

In one aspect, a computer-implemented method providing a transactional-consistent cache for database objects includes the steps of receiving new data by a cache manager implemented by one or more processors, and updating, by the cache manager, an entry of a cache with the new data received by the cache manager. The method further includes registering the updating of the entry with the new data with an invalidator implemented by one or more processors. The registering includes a timestamp. The method further includes generating an invalidation event by the invalidator. The invalidation event includes a notification about the updating of the entry of the cache with the new data received by the cache manager according to the timestamp.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide a caching and invalidation infrastructure that is extensible and applicable in various settings. Accordingly, in read-mostly environments, the cache system and method described herein help to reduce response times significantly, while updates do not compromise a snapshot isolation of the database system, and add very little overhead.

Figure 1:
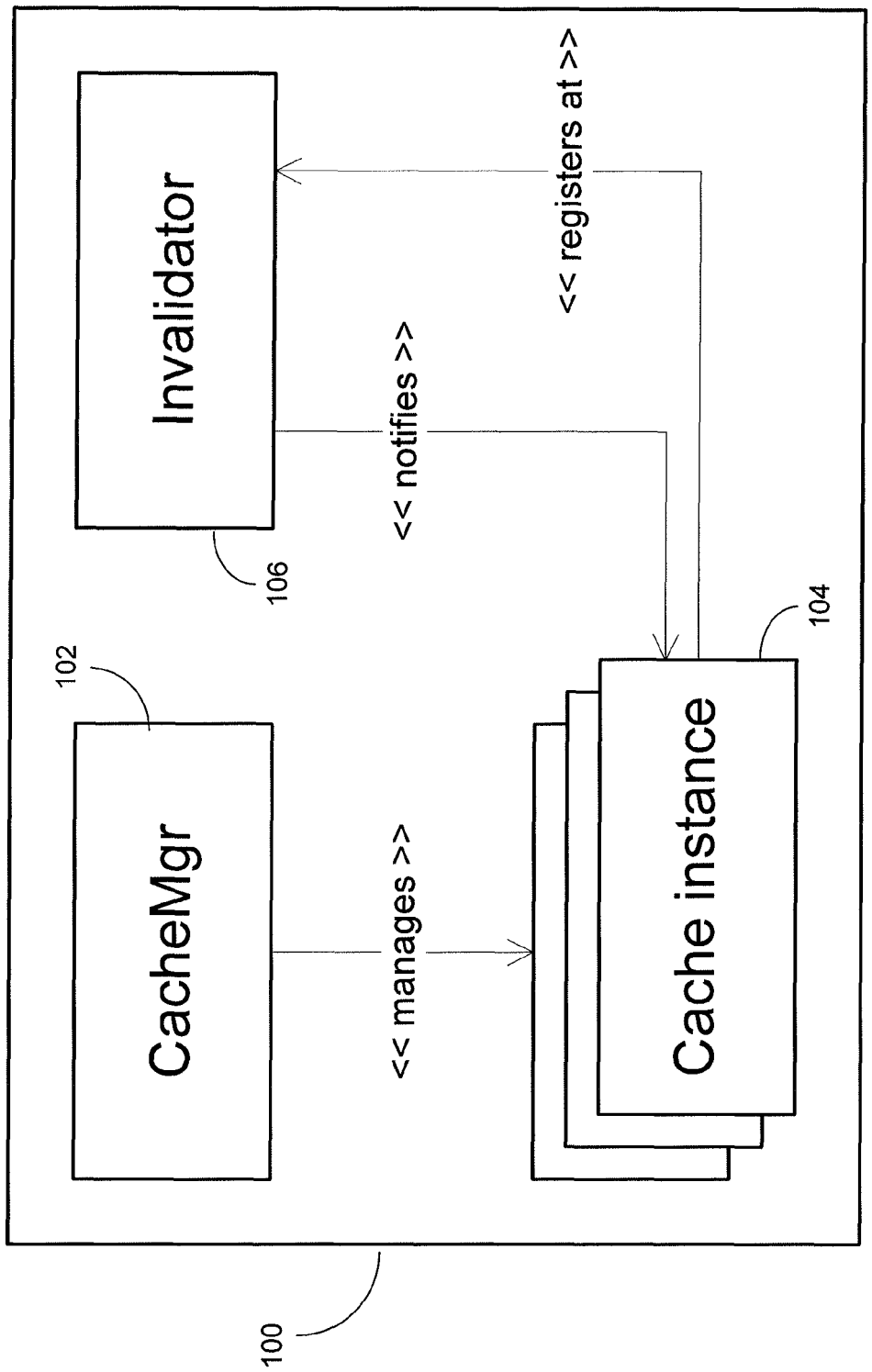
FIG. 1 is a block diagram of a cache system.

FIG. 1 is a block diagram of a cache system 100 for a database. The cache system 100 includes a cache manager 102 to manage each of one or more associated cache instances 104. The cache system 100 further includes an invalidator 106 in which cache entries from each cache instance 104 are registered, and which notifies each cache instance about changes to a cache as managed by the cache manager. The following describes the cache system 100 in further detail.

Each database node provides at least one cache system 100, and which executes one instance of the cache manager 102, which in turn manages cache instances 104. The management of the cache instances 104 by the cache manager 102 includes collecting cache usage statistics, and distributing the available memory budget across the cache instances 104. Furthermore, the cache manager 102 handles communication in a distributed landscape of cache systems 100 and index servers.

Cache instances 104 register and unregister at the cache manager 102. Cache entries consist of keys and values of a user-defined type. Cache instances 104 implement various interfaces, including insertion, lookup, check, and invalidation with a configurable set of cache replacement policies, e.g. least recently used (LRU) as an example. Cache systems 100 support MVCC and respect authorization privileges. Updates of metadata, data or privileges are supported, but further types can be supported.

Figure 2:
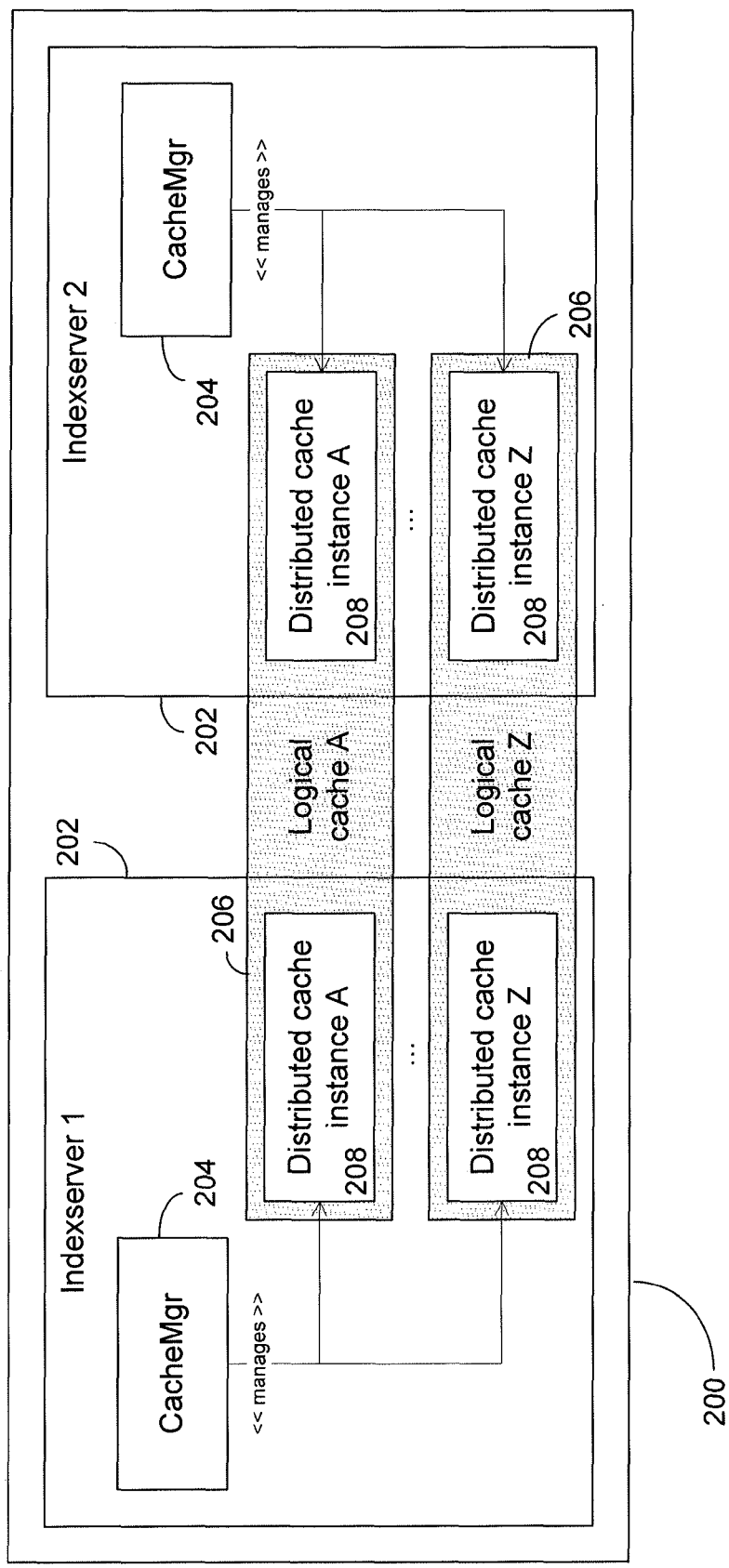
FIG. 2 is a block diagram of a distributed cache system.

Cache systems 100 can be local, or, as shown in FIG. 2, distributed in a distributed server landscape 200 across a number of index servers 202. The index servers 202 each include a cache manager 204 to support a number of logical caches 206. Each logical cache 208 supported by the distributed, multiple index servers 202 provides a number of distributed cache instances 208, each of which represents the same cache instance to each respective index server 202. Logical caches are identified by an ID, e.g. the name. Corresponding logical caches on all database nodes are identical.

Figure 3:
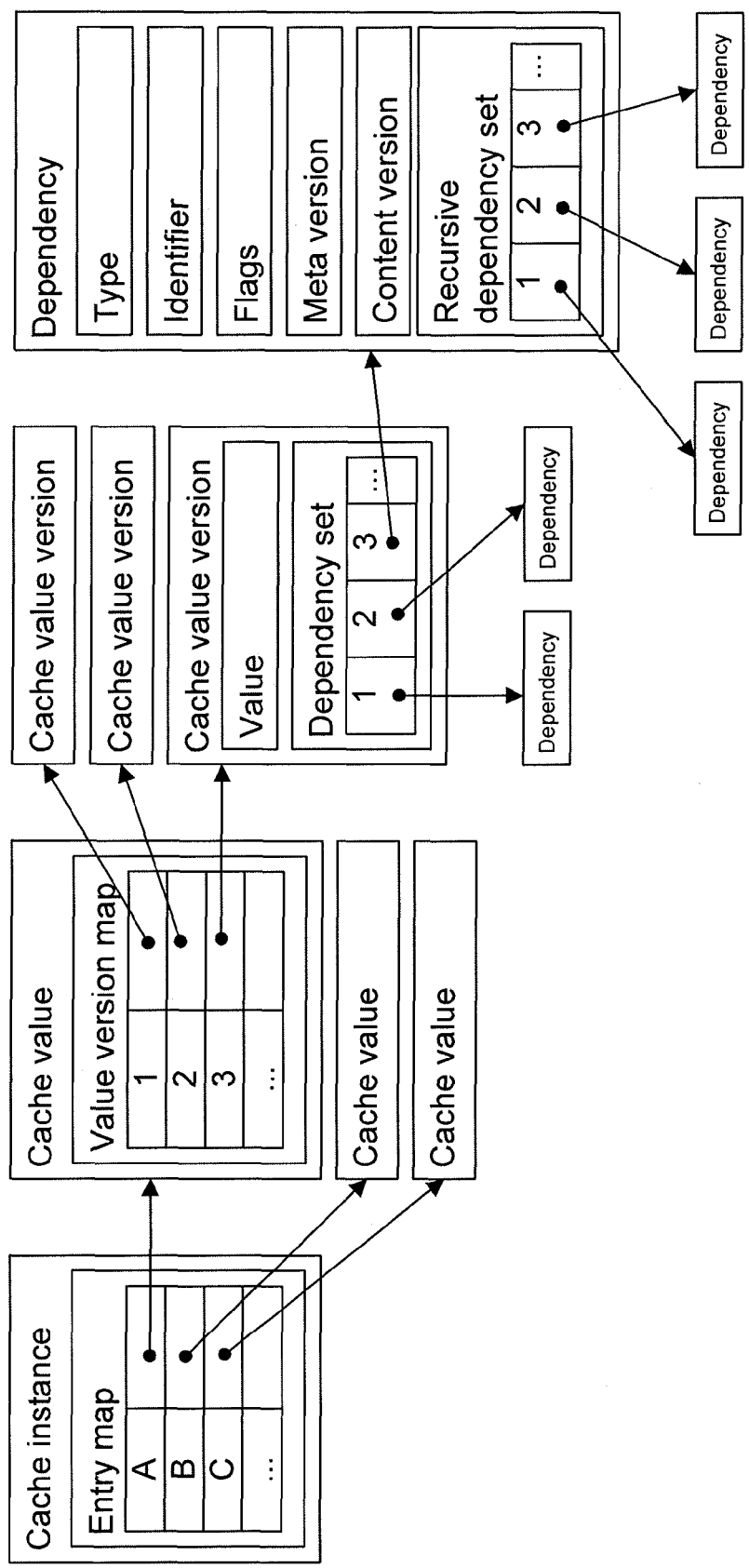
FIG. 3 is a diagram illustrating dependencies among cache instances and cache values.

As illustrated in FIG. 3, when cache entries are inserted into the cache, they are associated with dependent objects. A cache instance has a map of entries. The entries A, B, C, . . . refers to the key and point to the corresponding cache values. Each cached value has a map of versions (shown as 1, 2, 3 . . . ). Each version has a value and a set of dependencies (e.g. tables, views, etc.) the cache value version depends on. Dependencies are made up of a type (e.g. table or view), identifier (some identifier to identify the object), some configuration flags (e.g. should we look for meta data changes only, or should we also check for data changes; should sub-dependencies be processed), a meta and a content version and sub-dependencies (especially used by views that can be based on other views or tables).

Returning to FIG. 1, each index server executes one instance of the invalidator 106. Upon update of a dependent object, the invalidator 106 notifies cache instances 104 about changes to that dependent object. These notifications are dispatched from the invalidator 106 based on the registered dependencies. For faster invalidation, cache entries are marked as invalid. This allows for lookups of older snapshots based on transaction identifier, and asynchronous "garbage collection" of invalid cache entries.

Invalidator

Invalidation can be triggered manually for a specific cache entry. Additionally, automatic invalidation is triggered upon changes to data for which dependencies are registered. These dependencies have to be specified when a cache entry is added to the cache; recursive dependencies are resolved. A dependency is described by an identifier (e.g. objectID), a type (e.g. table), and change flags (e.g. metadata change). The type and change flag guide the invalidation process and are used to filter irrelevant events.

Invalidation upon an update triggers an invalidation event immediately when the update occurs. As this causes many invalidation events for update-intensive workloads, the invalidation can be performed on lookup. In this mode, a timestamp can be recorded for the dependent object when a cache entry is inserted, e.g. an internal counter that is incremented for updates on column store tables. If during cache lookup this counter is different from the current value, updates occurred since the cache entry was inserted. The main advantages of invalidation on lookup are 1) the effort for invalidation is amortized across multiple updates, and 2) only operations that potentially benefit from cache lookups have to pay for invalidation.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving new data by a cache manager implemented by one or more processors;
   updating, by the cache manager, an entry of a cache with the new data received by the cache manager;
   registering the updating of the entry with the new data with an invalidator implemented by one or more processors, the registering comprising a timestamp;
   registering dependencies for the entry of the cache with the new data;
   generating an invalidation event by the invalidator, the invalidation event including a notification about the updating of the entry of the cache with the new data received by the cache manager according to the timestamp; and
   amortizing invalidation across a plurality of updates by not invalidating, by the cache manager, all entries dependent upon the updated entry immediately when the entry is updated and by invalidating, by the cache manager, an entry dependent upon the updated entry in response to a lookup of the entry dependent upon the updated entry.

2. The method in accordance with claim 1, wherein a structure of the cache is configurable.

3. The method in accordance with claim 2, wherein the structure of the cache includes a key and a value for each entry.

4. A computer program product comprising a non-transitory machine-readable medium storing instructions that, when executed by at least one programmable processor, cause the at least one programmable processor to perform operations comprising:
   receive new data by a cache manager;
   update, by the cache manager, an entry of a cache with the new data received by the cache manager;
   register the updating of the entry with the new data with an invalidator, the registering comprising a timestamp;
   register dependencies for the entry of the cache with the new data;
   generate an invalidation event by the invalidator, the invalidation event including a notification about the updating of the entry of the cache with the new data received by the cache manager according to the timestamp; and
   amortize invalidation across a plurality of updates by not invalidating, by the cache manager, all entries dependent upon the updated entry immediately when the entry is updated and by invalidating, by the cache manager, an entry dependent upon the updated entry in response to a lookup of the entry dependent upon the updated entry.

5. The computer program product in accordance with claim 4, wherein a structure of the cache is configurable.

6. The computer program product in accordance with claim 5, wherein the structure of the cache includes a key and a value for each entry.

7. A system comprising:
   at least one programmable processor associated with an application server; and
   a machine-readable medium storing instructions that, when executed by the at least one processor, cause the at least one programmable processor to perform operations comprising:
   receive new data into a cache associated with the machine-readable medium;
   update an entry of a cache with the new data;
   register the updating of the entry with the new data, the registering comprising a timestamp;
   register dependencies for the entry of the cache with the new data;
   generate an invalidation event, the invalidation event including a notification about the updating of the entry of the cache with the new data received by the cache manager according to the timestamp; and
   amortize invalidation across a plurality of updates by not invalidating, by the cache manager, all entries dependent upon the updated entry immediately when the entry is updated and by invalidating, by the cache manager, an entry dependent upon the updated entry in response to a lookup of the entry dependent upon the updated entry.

8. The system in accordance with claim 7, wherein a structure of the cache is configurable.

9. The system in accordance with claim 8, wherein the structure of the cache includes a key and a value for each entry.

10. The method in accordance with claim 1, wherein invalidating the dependent entry in response to a lookup of the dependent entry occurs when a timestamp of the dependent entry is different from a current value of an internal counter.

11. The computer program product in accordance with claim 4, wherein invalidating the dependent entry in response to a lookup of the dependent entry occurs when a timestamp of the dependent entry is different from a current value of an internal counter.

12. The system in accordance with claim 7, wherein invalidating the dependent entry in response to a lookup of the dependent entry occurs when a timestamp of the dependent entry is different from a current value of an internal counter.

* * * * *